United States Patent
Nemavat

(10) Patent No.: US 8,621,185 B1
(45) Date of Patent: Dec. 31, 2013

(54) PROCESSOR LOAD DETERMINATION AND SPEED CONTROL

(75) Inventor: Pradeep Jugraj Nemavat, Maharashtra (IN)

(73) Assignee: Marvell International Ltd., Hamilton (BM)

(*) Notice: Subject to any disclaimer, the term of this patent is extended or adjusted under 35 U.S.C. 154(b) by 491 days.

(21) Appl. No.: 13/028,631

(22) Filed: Feb. 16, 2011

Related U.S. Application Data

(60) Provisional application No. 61/307,802, filed on Feb. 24, 2010, provisional application No. 61/369,963, filed on Aug. 2, 2010.

(51) Int. Cl.
*G06F 7/38* (2006.01)
*G06F 9/00* (2006.01)
*G06F 9/44* (2006.01)
*G06F 15/00* (2006.01)

(52) U.S. Cl.
USPC .......................................................... 712/220

(58) Field of Classification Search
None
See application file for complete search history.

(56) References Cited

U.S. PATENT DOCUMENTS

| | | | |
|---|---|---|---|
| 5,815,693 A * | 9/1998 | McDermott et al. | 713/501 |
| 2005/0172292 A1* | 8/2005 | Yamada et al. | 718/105 |
| 2011/0119682 A1* | 5/2011 | Hsu et al. | 718/107 |
| 2012/0233488 A1* | 9/2012 | Burchard et al. | 713/500 |

* cited by examiner

*Primary Examiner* — Corey S Faherty

(57) ABSTRACT

Apparatus having corresponding methods and non-transitory computer-readable media comprise a processor, wherein the processor is configured to count a number of iterations of an idle task loop executed by a processor during a first predetermined interval, determine a current load of the processor based on the number of iterations of the idle task loop executed by the processor during the first predetermined interval, determine a current operating frequency of the processor, and determine a desired operating frequency of the processor based on i) the current operating frequency of the processor and ii) the current load of the processor.

20 Claims, 4 Drawing Sheets

LPT task:
```
calibrate = 1;
iterations = 0;
calibrated_iterations = 0;
start_time = current_time();
Disable_interrupts();
While (1)
{
        iterations++;
        restart_timer(TIME_PERIOD);
        If (current_time() – start_time >= TIME_PERIOD)
        {
                If (calibrate == 1)
                {
                        calibrated_iterations = iterations;
                        calibrate = 0;
                        Enable_interrupts();
                }
                Else
                {
                        current_cpu_speed = get_current_cpu_speed();
                        Cpu_speed_required = current_cpu_speed * 1 – (iterations / calibrated_iterations);
                        If (cpu_speed_required > current_cpu_speed * INC_FACTOR)
                                newCpuSpeed = Increase the cpu speed to next higher level;
                        Else if (cpu_speed_required < cpu_speed_one_level_below * DEC_FACTOR)
                                newCpuSpeed = Decrease the cpu speed to next lower level;
                        If(newCpuSpeed != current_cpu_speed)
                                calibrated_iterations = calibrated_iterations * newCpuSpeed / current_cpu_speed;
                        current_cpu_speed = newCpuSpeed;
                }
                Iterations = 0;
                Start_time = current_time();
        }
}
```

Where, INC_FACTOR and DEC_FACTOR are real numbers and <=1

*FIG. 3*

Timer_routine:

Increase the cpu speed to next higher level;
    Iterations = 0;
    Start_time = current_time();
    restart_timer(TIME_PERIOD);

*FIG. 4*

PROCESSOR LOAD DETERMINATION AND SPEED CONTROL

CROSS-REFERENCE TO RELATED APPLICATIONS

This disclosure claims the benefit of U.S. Provisional Patent Application Ser. No. 61/307,802, entitled "Optimizing Power With Dynamic CPU Speed," filed on Feb. 24, 2010, and U.S. Provisional Patent Application Ser. No. 61/369,963, entitled "Optimizing Power With Dynamic CPU Speed," filed on Aug. 2, 2010, the disclosures thereof incorporated by reference herein in their entirety.

FIELD

The present disclosure relates generally to the field of processors, central processing units, and the like. More particularly, the present disclosure relates to determination of the load and control of the operating frequency (also referred to as the "speed") of such processors.

BACKGROUND

In processor-based electronic devices, such as computers, smartphones, and the like, power consumption is highly dependent upon the operating frequency (also referred to as the "speed") of the processor. It is highly desirable to reduce power consumption whenever possible, especially in portable devices so as to maximize battery life.

SUMMARY

In general, in one aspect, an embodiment features an apparatus comprising: a processor, wherein the processor is configured to count a number of iterations of an idle task loop executed by a processor during a first predetermined interval, determine a current load of the processor based on the number of iterations of the idle task loop executed by the processor during the first predetermined interval, determine a current operating frequency of the processor, and determine a desired operating frequency of the processor based on i) the current operating frequency of the processor and ii) the current load of the processor.

In general, in one aspect, an embodiment features non-transitory computer-readable media embodying instructions executable by a processor to perform functions comprising: counting a number of iterations of an idle task loop executed by the processor during a first predetermined interval; determining a current load of the processor based on the number of iterations of the idle task loop executed by the processor during the first predetermined interval; determining a current operating frequency of the processor; and determining a desired operating frequency of the processor based on i) the current operating frequency of the processor and ii) the current load of the processor.

In general, in one aspect, an embodiment features a method comprising: counting a number of iterations of an idle task loop executed by a processor during a first predetermined interval; determining a current load of the processor based on the number of iterations of the idle task loop executed by the processor during the first predetermined interval; determining a current operating frequency of the processor; and determining a desired operating frequency of the processor based on i) the current operating frequency of the processor and ii) the current load of the processor.

The details of one or more implementations are set forth in the accompanying drawings and the description below. Other features will be apparent from the description and drawings, and from the claims.

DESCRIPTION OF DRAWINGS

FIG. 3 shows example pseudocode for the idle task of FIG. 2 according to one embodiment.

FIG. 4 shows example pseudocode for a timer routine according to one embodiment.

Figure 1:
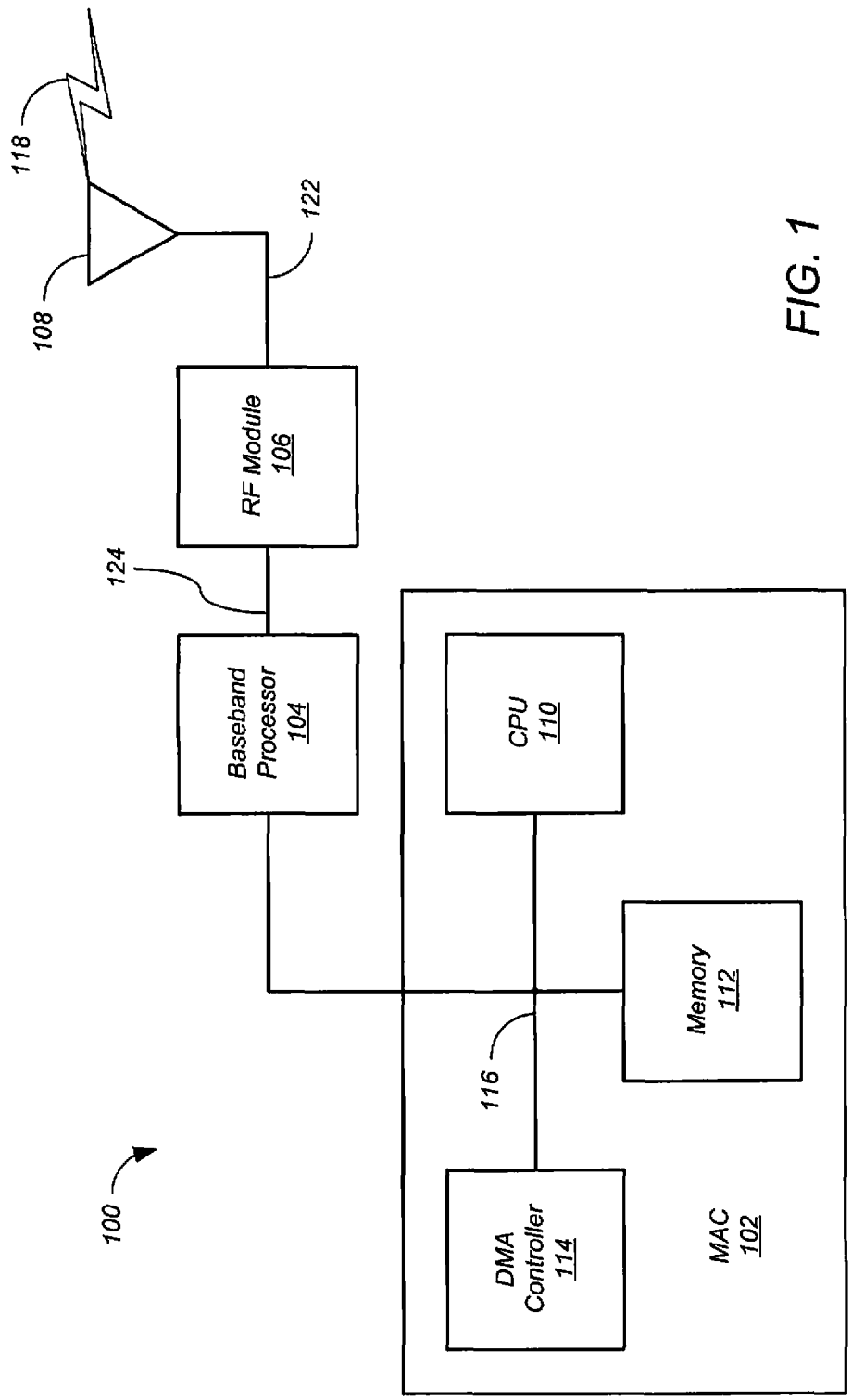
FIG. 1 shows elements of a processor-based wireless communication device according to one embodiment.

The leading digit(s) of each reference numeral used in this specification indicates the number of the drawing in which the reference numeral first appears.

DETAILED DESCRIPTION

Embodiments of the present disclosure provide determination of the load of a processor. According to these embodiments, a processor determines its load by executing a looping idle task, and counting the number of iterations of that idle task during a predetermined count interval. The current load is calculated by comparing the current count to a calibrated count that is determined when the processor is idle. A processor is considered to be idle, for example, when it is executing one task only (the idle task).

The idle task has a low priority, so that when the processor is busy with higher-priority tasks, the idle task does not execute as often, resulting in a low current count, which indicates a relatively heavy processor load. Conversely, when the processor has a relatively light load, the idle task executes more often, resulting in a high current count. Comparison of the current count to the calibrated count gives an accurate measure of the current load of the processor.

Embodiments of the present disclosure also provide control of the operating frequency (also referred to as the "speed") of the processor based on the load. First the current processor speed is determined. Then a desired processor speed is determined based upon the current processor speed and the current processor load. The processor speed is then controlled according to the desired processor speed.

In some cases, the processor load is so heavy that the idle task does not execute at all during the count interval. To accommodate this case, the processor speed is increased when the idle task does not execute within a predetermined execution interval.

FIG. 1 shows elements of a processor-based wireless communication device 100 according to one embodiment. Although in the described embodiments the elements of wireless communication device 100 are presented in one arrangement, other embodiments may feature other arrangements. For example, elements of wireless communication device 100 can be implemented in hardware, software, or combinations thereof. Furthermore, although the disclosed embodiments are described in the context of a wireless communication device, the techniques disclosed herein are applicable to any processor-based device.

Referring to FIG. 1, wireless communication device 100 includes a media access controller (MAC) 102, a baseband processor 104 in communication with MAC 102, a radio-frequency (RF) module 106 in communication with baseband processor 104, and an antenna 108 in communication with RF module 106. MAC 102 includes a central processing unit (CPU) 110, a memory 112, a direct memory access (DMA) controller 114, and a bus 116 in communication with CPU 110, memory 112, DMA controller 114, and baseband processor 104. MAC 102 can be implemented as a single integrated circuit, although this is not required.

Antenna 108 exchanges wireless signals 118 over an air link. The air link can be implemented as a wireless network, direct wireless link, or the like. In the case of a wireless network, wireless communication device 100 can be compliant with all or part of IEEE standard 802.11, including draft and approved amendments such as 802.11a, 802.11b, 802.11e, 802.11g, 802.11i, 802.11k, 802.11n, 802.11v, and 802.11w.

RF module 106 exchanges RF signals 122 with antenna 108, and exchanges corresponding intermediate-frequency (IF) signals 124 with baseband processor 104. DMA controller 114 passes data between memory 112 and baseband processor 104. The data can represent, for example, packets of data and the like.

Figure 2:
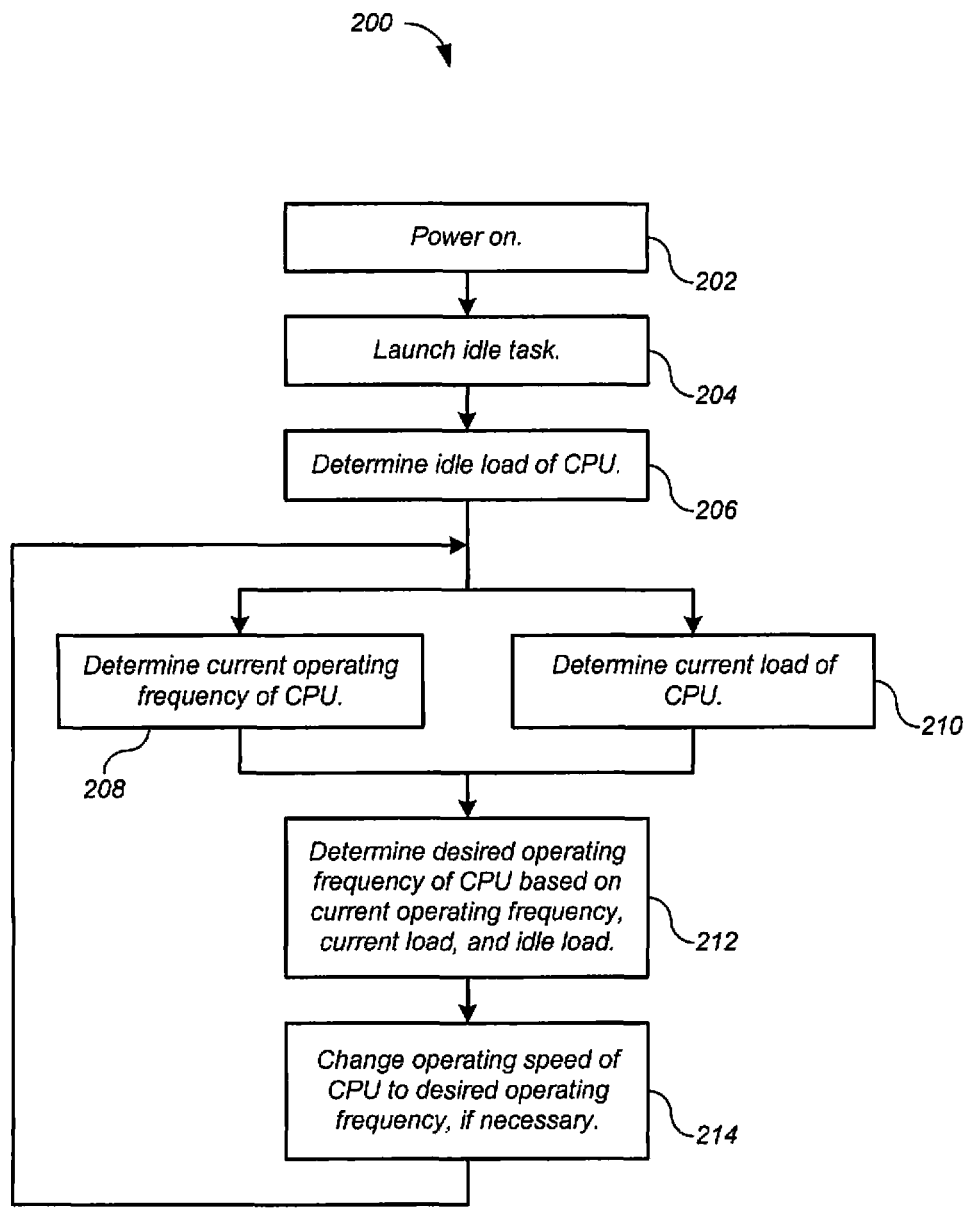
FIG. 2 shows a process for the CPU of FIG. 1 according to one embodiment.

FIG. 2 shows a process 200 for CPU 110 of FIG. 1 according to one embodiment. Although in the described embodiments the elements of process 200 are presented in one arrangement, other embodiments may feature other arrangements. For example, in various embodiments, some or all of the elements of process 200 can be executed in a different order, concurrently, and the like.

Referring to FIG. 2, at 202 wireless communication device 100 is powered on. At 204 CPU 110 launches a looping idle task. That is, the idle task includes a loop. FIG. 3 shows example pseudocode for the idle task according to one embodiment.

At 206 CPU 110 determines its idle load (also referred to herein as "calibration"). For example, referring now to the pseudocode of FIG. 3, at the start of calibration, CPU 110 disables interrupts to ensure the idle task is the only task executing during calibration. CPU 110 then counts the number of times Y the idle task loop is executed by CPU 110 during a predetermined calibration interval. Thus the value of Y represents the idle load of CPU 110. CPU 110 then enables interrupts. In the present embodiment, calibration is performed each time wireless communication device 100 is powered on or restarted. In other embodiments, calibration is performed less often, or only once, and the value of Y is stored for future use.

At 208, CPU 110 determines its current operating frequency, for example by reading a register storing a value representing the current operating frequency. At 210, CPU 110 determines its current load. In particular, CPU 110 determines its current load based on a number of iterations of the idle task loop executed by CPU 110 during a predetermined count interval. For example, referring now to the pseudocode of FIG. 3, the variable "iterations" is used to maintain a count of idle task loop iterations. The value of the variable "iterations" is incremented each time the idle task loop executes. In this manner, CPU 110 counts the number of times X the idle task loop is executed by CPU 110 during a predetermined count interval. Thus the value of X represents the current load of CPU 110. In some embodiments, the length of the count interval is the same as the length of the calibration interval.

At 212, CPU 110 determines the desired operating frequency of CPU 110 based on the current operating frequency of CPU 110, the current load of CPU 110, and the idle load of CPU 110. In particular, CPU 110 calculates the desired operating frequency of CPU 110 according to equation (1).

$$f_{desired} = f_{current}(1 - X/Y) \quad (1)$$

where $f_{desired}$ is the desired operating frequency, $f_{current}$ is the current operating frequency, X represents the number of idle task loop iterations executed by CPU 110 during the count interval with the current load, and Y represents the number of idle task loop iterations executed by CPU 110 during the count interval with no load. For example, given $f_{current}=100$ MHz, X=40, and Y=100, then according to equation (1), $f_{desired}=100(1-40/100)=60$ MHz. In general, a CPU is capable of only a few predetermined operating frequencies. Any sort of routine can be used to select one of these operating speeds based on the value of $f_{desired}$ obtained in equation (1). One possible routine is given in the pseudocode of FIG. 3, where scaling factors and threshold comparisons are used.

Note that the idle load varies according to the operating frequency of CPU 110. This is because the CPU 110 can execute the idle task more often at higher speeds than at lower speeds. This effect is linear, and so can be accommodated by simply scaling the value of Y according to the current operating frequency of CPU 110. In some embodiments, this scaling is done when determining the idle load at 206. In such embodiments, a respective value of Y is determined for each possible operating frequency. These values of Y are stored for use when determining the desired operating frequency of CPU 110 at 212. In other embodiments, an idle load is determined for only one operating frequency of CPU 110 at 206. In such embodiments, the scaling is applied when determining the desired operating frequency of CPU 110 at 212. FIG. 3 includes example pseudocode for scaling according to these embodiments.

At 214, CPU 110 changes its operating speed to the desired operating frequency, if necessary. In many cases no change is necessary because the desired operating frequency and the current operating frequency are the same. CPU 110 can change its operating speed, for example, by writing an appropriate value to a register storing a value that determines the current operating frequency. Process 200 then returns to determination of the current operating frequency and load of CPU 110 at 208 and 210.

In some cases, the load of CPU 110 is so heavy that the idle task does not execute at all during the count interval. To accommodate this case, CPU 110 increases its operating frequency when the idle task does not execute within a predetermined execution interval. For example, the idle task can load a countdown timer with the value of the execution interval during each execution of the idle task loop. Referring to the pseudocode of FIG. 3, the value of the execution interval is given by the constant "TIME_PERIOD." If the timer expires, indicating that the idle task has not executed during the execution interval, CPU 110 increases its operating frequency. FIG. 4 shows example pseudocode for a timer routine according to one embodiment.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. An apparatus comprising:
 a processor, wherein the processor is configured to
  count a number of iterations of an idle task loop executed by the processor during a first predetermined interval,
  determine a current load of the processor based on the number of iterations of the idle task loop executed by the processor during the first predetermined interval,
  determine a current operating frequency of the processor, and
  determine a desired operating frequency of the processor based on i) the current operating frequency of the processor and ii) the current load of the processor.

2. The apparatus of claim 1, wherein:
 responsive to the desired operating frequency being determined, the processor is further configured to operate at the desired operating frequency.

3. The apparatus of claim 1, wherein the processor is further configured to:
 determine an idle load of the processor; and
 determine the desired operating frequency of the processor based on i) the current operating frequency of the processor, ii) the current load of the processor, and iii) the idle load of the processor.

4. The apparatus of claim 3, wherein, to determine the idle load of the processor, the processor is further configured to:
 count a number of iterations of the idle task loop executed by the processor during a second predetermined interval while the processor is idle.

5. The apparatus of claim 4, wherein, to determine the desired operating frequency of the processor, the processor is further configured to:
 calculate the desired operating frequency of the processor as a product of the current operating frequency of the processor and (1−X/Y), wherein X represents the number of iterations of the idle task loop executed by the processor during the first predetermined interval and Y represents the number of iterations of the idle task loop executed by the processor during the second predetermined interval while the processor is idle.

6. The apparatus of claim 1, wherein the processor is further configured to:
 cause an increase in the operating frequency of the processor when the processor does not execute the idle task within a second predetermined interval.

7. The apparatus of claim 1, further comprising:
 a media access controller (MAC) comprising
  the processor,
  a memory, and
  a memory controller configured to transfer data between the memory and the processor.

8. A wireless communication device comprising:
 the MAC of claim 7;
 a baseband processor, wherein the memory controller is further configured to transfer data between the memory and the baseband processor;
 a radio-frequency module in communication with the baseband processor; and
 an antenna in communication with the radio-frequency module.

9. Non-transitory computer-readable media embodying instructions executable by a processor to perform functions comprising:
 counting a number of iterations of an idle task loop executed by the processor during a first predetermined interval;
 determining a current load of the processor based on the number of iterations of the idle task loop executed by the processor during the first predetermined interval;
 determining a current operating frequency of the processor; and
 determining a desired operating frequency of the processor based on i) the current operating frequency of the processor and ii) the current load of the processor.

10. The computer-readable media of claim 9, wherein the functions further comprise:
 causing the processor to operate at the desired operating frequency.

11. The computer-readable media of claim 9, wherein the functions further comprise:
 the determining an idle load of the processor; and
 determining the desired operating frequency of the processor includes determining the desired operating frequency of the processor based on i) the current operating frequency of the processor, ii) the current load of the processor, and iii) the idle load of the processor.

12. The computer-readable media of claim 11, wherein determining the idle load of the processor comprises:
 counting a number of iterations of the idle task loop executed by the processor during a second predetermined interval while the processor is idle.

13. The computer-readable media of claim 12, wherein determining the desired operating frequency of the processor comprises:
 calculating the desired operating frequency of the processor as a product of the current operating frequency of the processor and (1−X/Y), wherein X represents the number of iterations of the idle task loop executed by the processor during the first predetermined interval and Y represents the number of iterations of the idle task loop executed by the processor during the second predetermined interval while the processor is idle.

14. The computer-readable media of claim 9, wherein the functions further comprise:
 causing an increase in the operating frequency of the processor when the processor does not execute the idle task within a second predetermined interval.

15. A method comprising:
   counting a number of iterations of an idle task loop executed by a processor during a first predetermined interval;
   determining a current load of the processor based on the number of iterations of the idle task loop executed by the processor during the first predetermined interval;
   determining a current operating frequency of the processor; and
   determining a desired operating frequency of the processor based on i) the current operating frequency of the processor and ii) the current load of the processor.

16. The method of claim 15, further comprising:
   causing the processor to operate at the desired operating frequency.

17. The method of claim 15, further comprising:
   determining an idle load of the processor;
   wherein determining the desired operating frequency of the processor includes determining the desired operating frequency of the processor based on i) the current operating frequency of the processor, ii) the current load of the processor, and iii) the idle load of the processor.

18. The method of claim 17, wherein determining the idle load of the processor comprises:
   counting a number of iterations of the idle task loop executed by the processor during a second predetermined interval while the processor is idle.

19. The method of claim 18, wherein determining the desired operating frequency of the processor comprises:
   calculating the desired operating frequency of the processor as a product of the current operating frequency of the processor and (1−X/Y), wherein X represents the number of iterations of the idle task loop executed by the processor during the first predetermined interval and Y represents the number of iterations of the idle task loop executed by the processor during the second predetermined interval while the processor is idle.

20. The method of claim 15, further comprising:
   causing an increase in the operating frequency of the processor when the processor does not execute the idle task within a second predetermined interval.

\* \* \* \* \*